US011685331B2

United States Patent
Lee et al.

(10) Patent No.: US 11,685,331 B2
(45) Date of Patent: Jun. 27, 2023

(54) SEAT AIRBAG FOR VEHICLE

(71) Applicant: HYUNDAI MOBIS CO., LTD., Seoul (KR)

(72) Inventors: Choong Ryung Lee, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/242,543

(22) Filed: Apr. 28, 2021

(65) Prior Publication Data
US 2021/0354653 A1 Nov. 18, 2021

(30) Foreign Application Priority Data
May 13, 2020 (KR) .................. 10-2020-0057389

(51) Int. Cl.
*B60R 21/231* (2011.01)
*B60R 21/207* (2006.01)
(Continued)

(52) U.S. Cl.
CPC ...... *B60R 21/23138* (2013.01); *B60R 21/207* (2013.01); *B60R 21/233* (2013.01); *B60R 21/2338* (2013.01); *B60R 2021/23146* (2013.01)

(58) Field of Classification Search
CPC ............ B60R 21/23138; B60R 21/207; B60R 21/233; B60R 21/2338; B60R 2021/23146; B60R 2021/23161; B60R 2021/23386; B60R 21/239; B60R 2021/0044; B60R 2021/0048; B60R 2021/0055; B60R 2021/0058; B60R 2021/23538
See application file for complete search history.

(56) References Cited

U.S. PATENT DOCUMENTS

| 5,636,862 A | 6/1997 | Cheung et al. |
| 5,927,750 A | 7/1999 | Nakamura et al. |

(Continued)

FOREIGN PATENT DOCUMENTS

| CN | 104276124 A | 1/2015 |
| CN | 107757543 A | 3/2018 |

(Continued)

OTHER PUBLICATIONS

"Extended Search Report issued in European Patent Application No. 21172038.8" dated Aug. 4, 2021, 7 Pages.
(Continued)

*Primary Examiner* — Drew J Brown
(74) *Attorney, Agent, or Firm* — NovoTechIP International PLLC

(57) ABSTRACT

The present invention relates to a seat airbag for a vehicle in which a side cushion 100 is deployed to protrude forward from a seatback 10 and protects the side of a passenger 20, a front cushion 200 is deployed to protrude from the side cushion 100 to the front of the passenger 20 and protects the front of the passenger 20, an upper tether 300 and a lower tether 400 exhibiting strong restraint force are connected to the side cushion 100 and the front cushion 200. Thus, it is possible to effectively restrain the passenger's lateral behavior, forward behavior, and diagonal behavior, thereby further enhancing the passenger's protective effect.

12 Claims, 8 Drawing Sheets

(51) Int. Cl.
  *B60R 21/233* (2006.01)
  *B60R 21/2338* (2011.01)

(56) References Cited

U.S. PATENT DOCUMENTS

| | | | |
|---|---|---|---|
| 6,065,772 A | 5/2000 | Yamamoto et al. | |
| 9,994,181 B1 * | 6/2018 | Dubaisi | B60R 21/207 |
| 10,336,283 B2 | 7/2019 | Rickenbach et al. | |
| 10,486,638 B2 * | 11/2019 | Kwon | B60R 21/23138 |
| 10,543,800 B2 * | 1/2020 | Kwon | B60R 21/207 |
| 10,875,486 B2 | 12/2020 | Kim | |
| 11,247,633 B1 * | 2/2022 | Schneider | B60R 21/239 |
| 2006/0119082 A1 | 6/2006 | Peng et al. | |
| 2006/0131847 A1 | 6/2006 | Sato et al. | |
| 2018/0326938 A1 | 11/2018 | Rickenbach et al. | |
| 2019/0054890 A1 | 2/2019 | Kwon | |
| 2019/0111880 A1 | 4/2019 | Choi | |
| 2020/0189514 A1 | 6/2020 | Yoo et al. | |
| 2020/0324728 A1 * | 10/2020 | Deng | B60R 22/12 |
| 2021/0001799 A1 * | 1/2021 | Sandinge | B60R 21/231 |
| 2021/0179009 A1 | 6/2021 | Lee et al. | |
| 2021/0245699 A1 | 8/2021 | Adler et al. | |
| 2021/0354653 A1 | 11/2021 | Lee et al. | |
| 2021/0402949 A1 * | 12/2021 | Sung | B60R 21/233 |

FOREIGN PATENT DOCUMENTS

| | | | | |
|---|---|---|---|---|
| CN | 110040098 A | | 7/2019 | |
| CN | 110979240 A | | 4/2020 | |
| CN | 112810563 A | * | 5/2021 | B60R 21/207 |
| DE | 102019103484 A1 | | 8/2019 | |
| DE | 102018104392 A1 | | 9/2019 | |
| DE | 102018120159 A1 | | 9/2019 | |
| DE | 102019124091 A1 | * | 7/2020 | B60R 21/16 |
| DE | 202020106159 U1 | * | 12/2020 | B60R 21/207 |
| DE | 102020103916 A1 | * | 8/2021 | |
| JP | H10-175498 A | | 6/1998 | |
| JP | 2013154786 A | | 8/2013 | |
| KR | 20190020254 A | | 2/2019 | |
| KR | 20200029334 A | * | 3/2020 | |
| KR | 10-2020-0075065 A | | 6/2020 | |
| KR | 10-2020-0141727 A | | 12/2020 | |
| WO | 2020017280 A1 | | 1/2020 | |
| WO | WO-2020080747 A1 | * | 4/2020 | B60R 21/207 |
| WO | 2020141737 A1 | | 7/2020 | |
| WO | WO-2022008403 A1 | * | 1/2022 | |
| WO | WO-2022008406 A1 | * | 1/2022 | |

OTHER PUBLICATIONS

"Extended Search Report issued in European Patent Application No. 21172285.5" dated Aug. 2, 2021, 11 Pages.

Office Action dated Mar. 23, 2022 in related U.S. Appl. No. 17/246,974.

Office Action dated Feb. 13, 2023 in corresponding European patent application No. 21172038.8.

Office Action dated Mar. 28, 2023 in corresponding Chinese patent application No. 202110499721.1.

Office Action dated Mar. 29, 2023 in corresponding Chinese patent application No. 202110518873.1.

* cited by examiner

SEAT AIRBAG FOR VEHICLE

CROSS-REFERENCE TO RELATED APPLICATION

This application claims priority from Korean Patent Application No. 10-2020-0057389, filed on May 13, 2020, in the Korean Intellectual Property Office, the disclosure of which is incorporated herein by reference in its entirety.

BACKGROUND OF THE INVENTION

Field of the Invention

The present invention relates to a seat airbag for a vehicle, and more particularly, to a technology directed to a seat airbag for a vehicle capable of effectively restrain both the lateral behavior, the front behavior, and the diagonal behavior of a passenger by using a side cushion developed from a seatback and a front cushion extending from the side cushion.

Description of the Related Art

Autonomous vehicles are smart vehicles that incorporate autonomous driving technology that allows drivers to go to their destination by themselves without directly operating a steering wheel, accelerator pedal, brake, etc., and have been rapidly developed in recent years.

If autonomous driving situation is universally realized, a driver can select a relaxation mode in which the driver takes a break without driving himself while driving, and in the relaxation mode situation, the movement, rotation and posture of a seat can be changed in various ways according to the needs of a passenger.

As described above, when the seating conditions of passengers are changed in various ways in the autonomous driving situation, the airbag provided in the existing vehicle cannot effectively restrain the passenger's behavior in the event of an accident. Thus, there is a need for a new concept of airbag suitable for autonomous vehicles.

The matters described as the background art are only for enhancing an understanding of the background of the present invention, and should not be taken as acknowledging that they correspond to the prior art already known to those of ordinary skill in the art.

SUMMARY OF THE INVENTION

The present invention is a seat airbag applicable to an autonomous vehicle, and the purpose is to effectively restrain both the lateral behavior, the front behavior, and the diagonal behavior of a passenger, and further enhance the passenger's protective effect by using a side cushion that is deployed to protrude forward from a seatback and a front cushion that is deployed to protrude from the side cushion to the front of the passenger.

In addition, another purpose of the present invention is to restrain the deployment of the side cushion and the front cushion by using an upper tether and a lower tether, thereby further reinforcing the passenger's restraint force, and reducing the injuries of the passengers.

In addition, another purpose of the present invention which is a configuration including a separator having a vent hole formed between the side cushion and the front cushion is to prevent a situation in which the front cushion is first swollen before the side cushion is deployed.

In order to achieve the purpose above, the seat airbag for a vehicle according to the present invention includes a side cushion that is deployed to protrude forward from a seatback and to cover and protect a side of a passenger after deployment; a front cushion that is deployed to protrude from the side cushion to a front of the passenger and to cover and protect a front of the passenger after deployment; and an upper tether that is coupled to connect an upper portion of the seatback, and the side cushion and the front cushion, and is unfolded in a plane of a predetermined size to restrain the deployment of the side cushion and the front cushion when the side cushion and the front cushion are deployed.

The side cushion covers and protects the head, shoulder, chest, abdomen, and pelvis in the side of the passenger when deployed.

The front cushion covers and protects a frontal area of the passenger extending from the passenger's shoulder to abdomen when deployed.

A first separator that divides an inner space of the side cushion while determining a thickness of a deployed cushion is installed in combination with the side cushion inside the side cushion; and a plurality of first vent holes for controlling a flow of an airbag gas is formed in the first separator.

A connection passage for connection with the front cushion is formed at a front portion of the side cushion; a second separator that determines a thickness of a deployed cushion is installed in combination with the side cushion at a rear portion of the connection passage; and a second vent hole for controlling the flow of the airbag gas supplied to the front cushion is formed in the second separator.

A cross-sectional area of the first vent hole is larger than a cross-sectional area of the second vent hole.

The side cushion includes a first side cushion that is deployed in a space between a vehicle door and the side of the passenger at one side of the seatback, and a second side cushion that is deployed into a space between a center console and the side of the passenger at the other side of the seatback; the front cushion includes a first front cushion that is extendedly deployed from the first side cushion, and a second front cushion that is extendedly deployed from the second side cushion; and the first front cushion and the second front cushion are connected to a left and right when deployed.

The upper tether is configured to be deployed by avoiding an area that causes harm to the neck of the passenger while passing over the shoulder of the passenger.

The upper tether is formed so that an unfolded shape becomes a triangular shape when deployed, any one vertex is fixedly coupled to an upper portion of the seatback, one of outer sides is attached to an inner surface of the side cushion, and one side facing the front is sewn and coupled to an upper surface of the front cushion.

The upper tether includes a first upper tether that is coupled to connect the upper portion of the seatback, and an inner surface of the first side cushion and an upper surface of the first front cushion; and a second upper tether that is coupled to connect the upper portion of the seatback, and an inner surface of the second side cushion and an upper surface of the second front cushion.

As a connection point at which the first upper tether and the upper portion of the seatback are coupled is spaced apart from the first side cushion in an opposite direction, a restraint force of the first side cushion and the first front cushion by the first upper tether increases; and as a connection point at which the second upper tether and the upper portion of the seatback are coupled is spaced apart from the second side cushion in an opposite direction, a restraint force of the second side cushion and the second front cushion by the second upper tether increases.

The first upper tether and the second upper tether are deployed in any one of a ‖-shape, an X-shape, and a V-shape.

The airbag further includes a lower tether that is coupled to connect a lower portion of the seatback and the front cushion, and is unfolded in a plane of a predetermined size to restrain the deployment of the front cushion so that the front cushion is prevented from being lifted.

The lower tether is formed to have a triangular unfolded shape when deployed, any one vertex is fixedly coupled to the lower portion of the seatback, and one side facing a front is sewn and coupled to a bottom portion of the front cushion.

The side cushion includes a first side cushion that is deployed in a space between a vehicle door and the side of the passenger at one side of the seatback, and a second side cushion that is deployed into a space between a center console and the side of the passenger at the other side of the seatback; the front cushion includes a first front cushion that is extendedly deployed from the first side cushion, and a second front cushion that is extendedly deployed from the second side cushion; and the lower tether includes a first lower tether that is coupled to connect the lower portion of the seatback and a bottom portion of the first front cushion, and a second lower tether that is coupled to connect the lower portion of the seatback and a bottom portion of the second front cushion

DETAILED DESCRIPTION OF THE PREFERRED EMBODIMENTS

Figure 1:
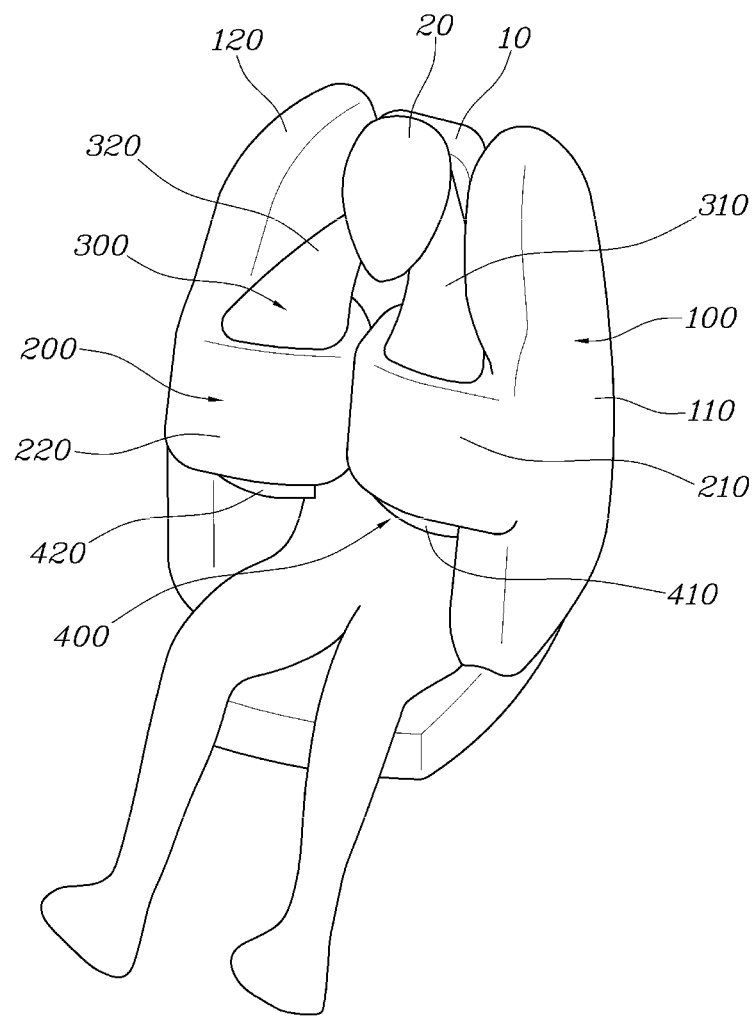
FIG. 1 is a perspective view of a seat airbag for a vehicle in a deployed state according to the present invention.

Specific structural or functional descriptions of the embodiments of the present invention disclosed in this specification or application are exemplified only for the purpose of describing the embodiments according to the present invention, and the embodiments according to the present invention may be implemented in various forms and should not be construed as being limited to the embodiments described in this specification or application.

Since the embodiments according to the present invention can be modified in various ways and have various forms, specific embodiments are illustrated in the drawings and will be described in detail in the present specification or application. However, this is not intended to limit the embodiments according to the concept of the present invention to a specific form of disclosure, and it should be understood to include all changes, equivalents, and substitutes included in the spirit and scope of the present invention.

Terms such as first and second may be used to describe various components, but the components should not be limited by the terms. The above terms are only for the purpose of distinguishing one component from other components, for example, without departing from the scope of the rights according to the concept of the present invention, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present invention. Singular expressions include plural expressions unless the context clearly indicates otherwise. In the present specification, terms such as "comprise" or "have" are intended to designate the existence of a specified feature, number, step, action, component, part, or combination thereof, and are understood that the presence or addition of one or more other features or numbers, steps, actions, elements, parts, or combinations thereof is not preliminarily excluded.

Unless otherwise defined, all terms used herein, including technical or scientific terms, have the same meaning as commonly understood by one of ordinary skill in the art to which the present invention belongs. Terms such as those defined in commonly used dictionaries should be interpreted as having meanings consistent with the meanings of the related technology, and should not be interpreted as ideal or excessively formal meanings unless explicitly defined in the present specification.

A control unit (controller) according to an exemplary embodiment of the present invention may be implemented through an algorithm configured to control the operation of various components of a vehicle or a nonvolatile memory (not shown) configured to store data related to a software command for reproducing the algorithm, and a processor (not shown) configured to perform an operation described below using data stored in the corresponding memory. Here, the memory and the processor may be implemented as separate chips. Alternatively, the memory and processor may be implemented as a single chip integrated with each other. The processor may take the form of one or more processors.

Hereinafter, a seat airbag for a vehicle according to an embodiment of the present invention will be described with reference to the accompanying drawings.

The seat airbag for a vehicle 100 according to the present invention, as shown in FIGS. 1 to 8, includes a side cushion 100 that is deployed to protrude forward from a seatback 10 constituting a vehicle seat and covers and protects the side of a passenger 20 after deployment; a front cushion 200 that is deployed to protrude from the side cushion 100 to the front of the passenger 20 and covers and protects the front of the passenger 20 after deployment; an upper tether 300 that is coupled to connect an upper portion of the seatback 10 and the side cushion 100 and the front cushion 200, and is unfolded in a plane of a predetermined size to restrain the deployment of the side cushion 100 and the front cushion 200 when the side cushion 100 and the front cushion 200 are deployed; and a lower tether 400 that is coupled to connect a lower portion of the seatback 10 and the front cushion 200, and is unfolded in a plane of a predetermined size to prevent the front cushion 200 from being lifted, and to restrain the deployment of the front cushion 200 when the front cushion 200 is deployed.

The airbag according to the present invention is a configuration in which the side cushion 100 is deployed to be protruded from the seatback 10, the side cushion 100 is first deployed, and then the front cushion 200 is sequentially deployed from the side cushion 100 and unfolded. Thus, the seat can be moved and rotated, and in particular, it has the advantage of being suitable for use in autonomous vehicles with various seating conditions for passengers.

In addition, in one embodiment according to the present invention, the tether for restraining the deployment of the side cushion 100 and the front cushion 200 is a cotton tether having a predetermined area rather than a general string-shaped tether. In particular, the embodiment is a configuration that restrains the deployment of the side cushion 100 and the front cushion 200 using the strong restraint force of the upper tether 300 and the lower tether 400. Thus, it can effectively restrain both the lateral and frontal and diagonal behaviors of the passenger, thereby further strengthening the protection effect of passengers. As a result, there is an advantage of maximizing the reduction of the injuries of passengers in the event of an accident.

The side cushion 100 according to the present invention covers and protects all of a head 21, a shoulder 22, a chest 23, an abdomen 24, and a pelvis 25 on the side of the passenger 20 when deployed. The front cushion 200 simultaneously covers and protects the frontal area of the passenger extending from the shoulder 21 to the abdomen 24 when deployed.

The side cushion 100 and the front cushion 200 can both cover and protect the portion of the shoulder 22 with relatively high rigidity among the body parts of the passenger 20, thereby reducing the passenger's injury as much as possible.

The inflator that injects airbag gas is fixedly coupled to the seatback frame constituting the seatback 10, and the airbag gas generated when the inflator is exploded is supplied in the order of the side cushion 100 and the front cushion 200, thereby, the side cushion 100 is deployed first and then the front cushion 200 is deployed by the pressure of the airbag gas.

Figure 5:
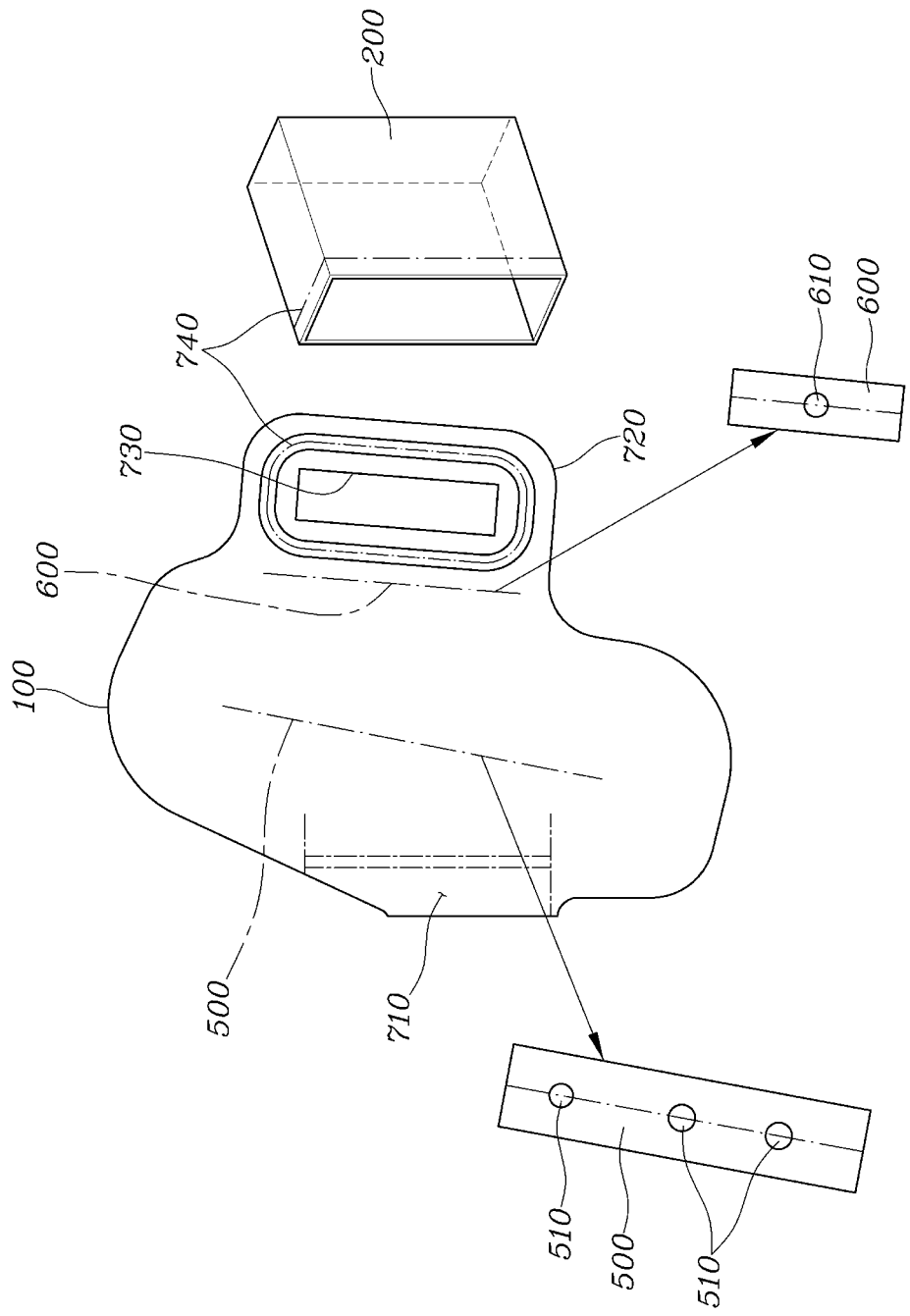
FIG. 5 is a view of a side cushion and a front cushion in a separated state according to the present invention.

In FIG. 5, a reference numeral 710 is an inlet 710 through which airbag gas is supplied from the side cushion 100, and a first separator 500 that divides the inner space of the side fusion 100 while determining the thickness of the deployed cushion is installed in combination with the side cushion 100 inside the side cushion 100. A plurality of first vent holes 510 for controlling the flow of airbag gas is formed in the first separator 500.

In addition, at a front portion 720 of the side cushion 100 connected to the front cushion 200 in the side cushion 100, a connection passage 730 formed with a relatively large hole for connection with the front cushion 200 is formed. At the rear portion of the connection passage 730, a second separator 600 that determines the thickness of the deployed cushion is installed in combination with the side cushion 100. A second vent hole 610 for controlling the flow of the supplied airbag gas is formed in the second separator 600.

When the inflator explodes, the side cushion 100 must be deployed first and then the front cushion 200 must be deployed. Thus, a large amount of airbag gas must first be supplied to the side cushion 100, and for this purpose, the first vent hole 510 is formed in a plurality that is greater than the number of the second vent hole 610, in particular, the cross-sectional area of the first vent hole 510 is formed larger than the cross-sectional area of the second vent hole 610.

The side cushion 100 is first deployed and then the front cushion 200 is deployed through tuning of the numbers and the cross-sectional areas of holes of the first and second vent holes 510 and 610.

If, before the side cushion 100 is deployed, the front cushion 200 is first inflated and deployed, the front cushion 200 is caught between the passenger 20 and the vehicle door 30, or between the passenger 20 and the center console 40 so that the probability of deployment failure due to interference is increased. To prevent this, by tuning the cross-sectional area of holes and the numbers of the first and second vent holes 510 and 610, the side cushion 100 is deployed first and then the front cushion 200 can be deployed.

In FIG. 5, a reference numeral 740 denotes a sewing line 740 for coupling the side cushion 100 and the front cushion 200 around the connection passage 730.

Figure 6:
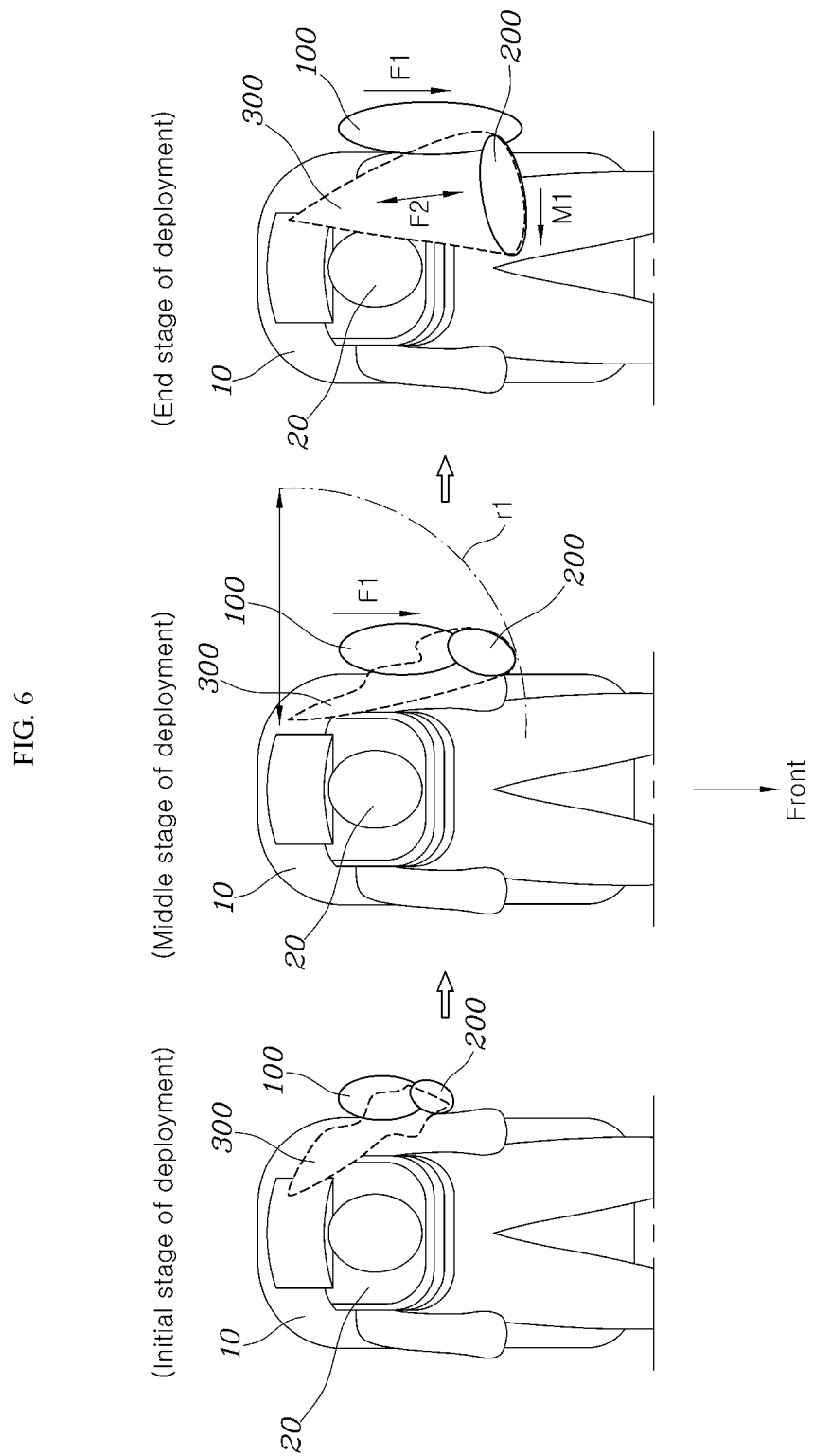
FIG. 6 is a view for explaining a state in which a side cushion and a front cushion are deployed, according to the present invention.

FIG. 6 shows the deployment process of the side cushion 100 and the front cushion 200. At the initial stage of deployment, the side cushion 100 and the front cushion 200 begin to be deployed by the pressure of the airbag gas, and the upper tether 300 also begins to unfold.

At the middle stage of deployment, the front cushion 200 is restrained within a rotation radius r1 of the upper tether 300 by the restraint of the upper tether 300, and the front cushion 200 is pushed forward by the forward deployment force (arrow F1) of the side cushion 100.

An arrow L1 is the maximum length of the upper tether 300.

At the end stage of deployment, the deployment of the side cushion 100 is completed, and the front cushion 200 is bent toward the passenger 20 by the tension F2 of the upper tether 300 to reach the front of the passenger 20. (Arrow M1), Thus, the side cushion 100 covers and protects the side of the passenger 20, and the front cushion 200 covers and protects the front of the passenger 20.

The side cushion 100 according to the present invention includes a first side cushion 110 that is deployed in the space between a vehicle door 30 and the side of the passenger 20 at one side of the seatback 10, and a second side cushion 120 that is deployed into a space between the center console 40 and the side of the passenger 20 at the other side of the seatback 10. The front cushion 200 includes a first front cushion 210 that is extendedly deployed from the first side cushion 110 toward the front of the passenger 20, and a second front cushion 220 that is extendedly deployed from the second side cushion 120 toward the front of the passenger 20. When the first front cushion 210 and the second front cushion 220 are deployed, their ends are in contact with each other and are connected to the left and right. Thus, it is possible to further enhance the protective effect of the passenger 20 with a more solid support.

The upper tether 300 is configured to avoid an area that causes harm to the neck of the passenger 20 while passing over the shoulder 22 of the passenger 20, that is, to deploy to an area that does not harm the neck of the passenger 20.

The upper tether 300 according to the present invention is formed so that the unfolded shape becomes a triangular shape when deployed. Any one vertex is fixedly coupled to the upper portion of the seatback 10, one of the outer sides is attached to the inner surface of the side cushion 100, and one side facing the front is sewn and coupled to the upper surface of the front cushion 200.

The upper tether 300 includes a first upper tether 310 that is coupled to connect the upper portion of the seatback 10, and the inner surface of the first side cushion 110 and the upper surface of the first front cushion 210, and a second upper tether 320 that is coupled to connect the upper portion of the seatback 10, and the inner surface of the second side cushion 120 and the upper surface of the second front cushion 220.

On the other hand, as the connection point at which the first upper tether 310 and the upper portion of the seatback 10 are coupled is spaced apart from the first side cushion 110 in the opposite direction, the tension of the first upper tether 310 increases. As the tension of the first upper tether 310 increases, the restraint force of the first side cushion 110 and the first front cushion 210 by the first upper tether 310 increases. Thus, it is possible to restrain the passenger 20 more reliably, and injuries to passengers in the event of an accident can be reduced as much as possible.

Likewise, as the connection point at which the second upper tether 320 and the upper portion of the seatback 10 are coupled is spaced apart from the second side cushion 120 in the opposite direction, the tension of the second upper tether 320 increases, As the tension of the second upper tether 320 increases, the restraint force of the second side cushion 120 and the second front cushion 220 by the second upper tether 320 increases. Thus, it is possible to restrain the passenger 20 more reliably, and injuries to passengers in the event of an accident can be reduced as much as possible.

Figure 2:
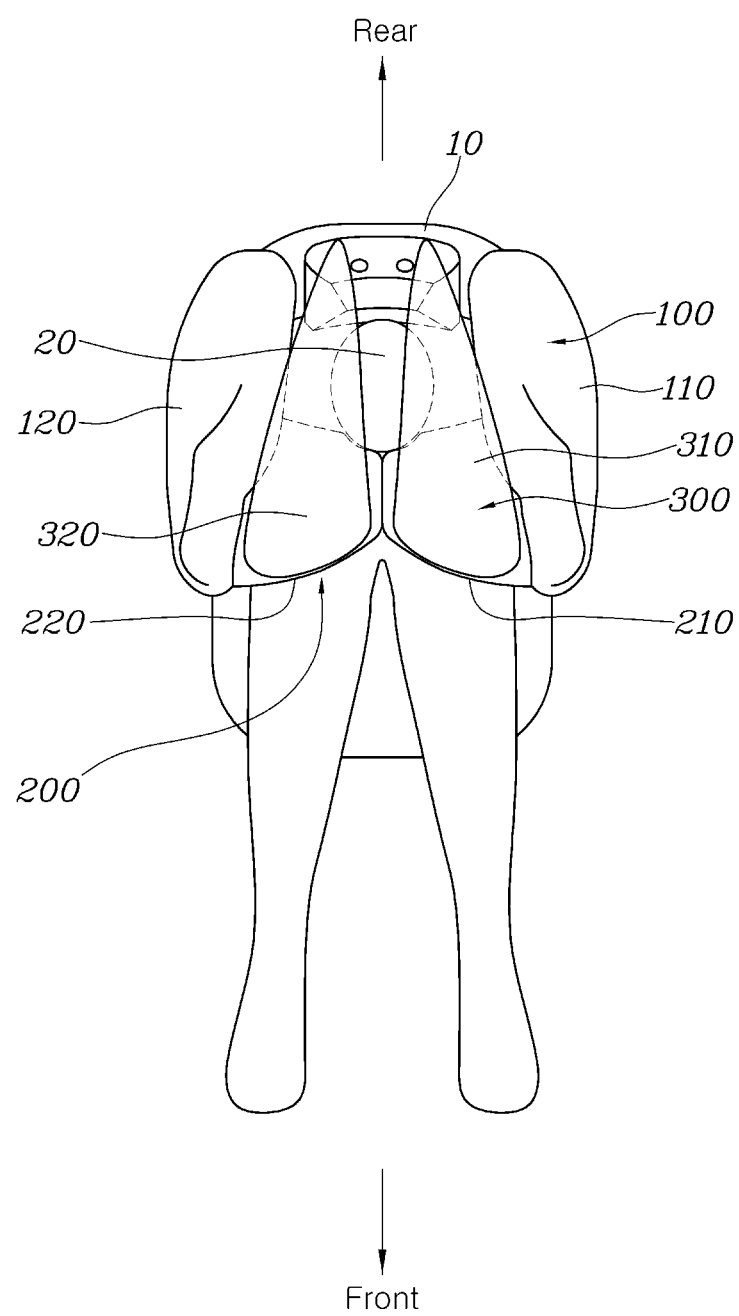
FIGS. 2 to 4 are a plan view, a front view, and a side view of FIG. 1.
Figure 3:
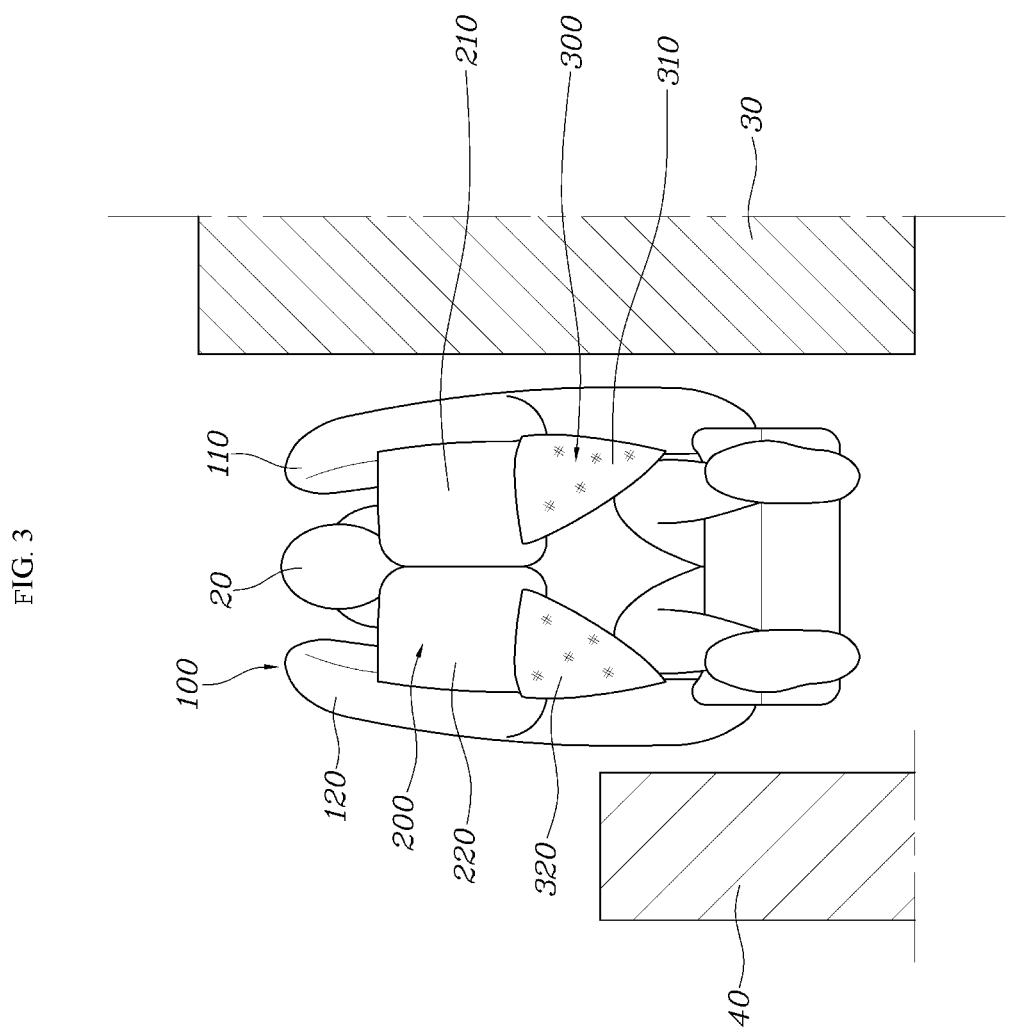
Figure 4:
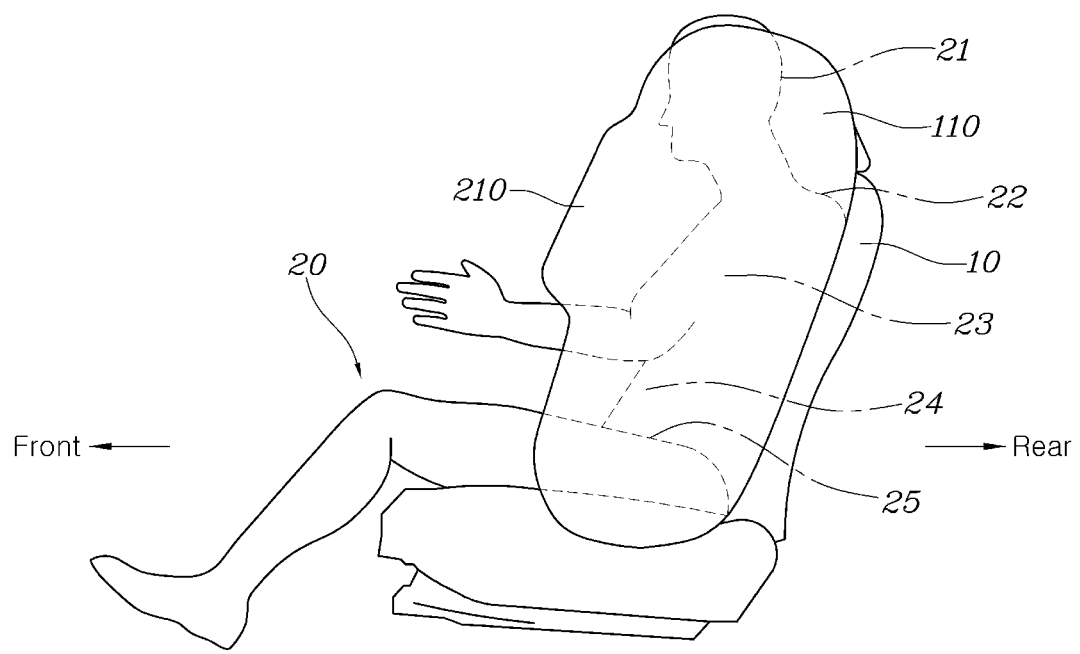
Figure 7:
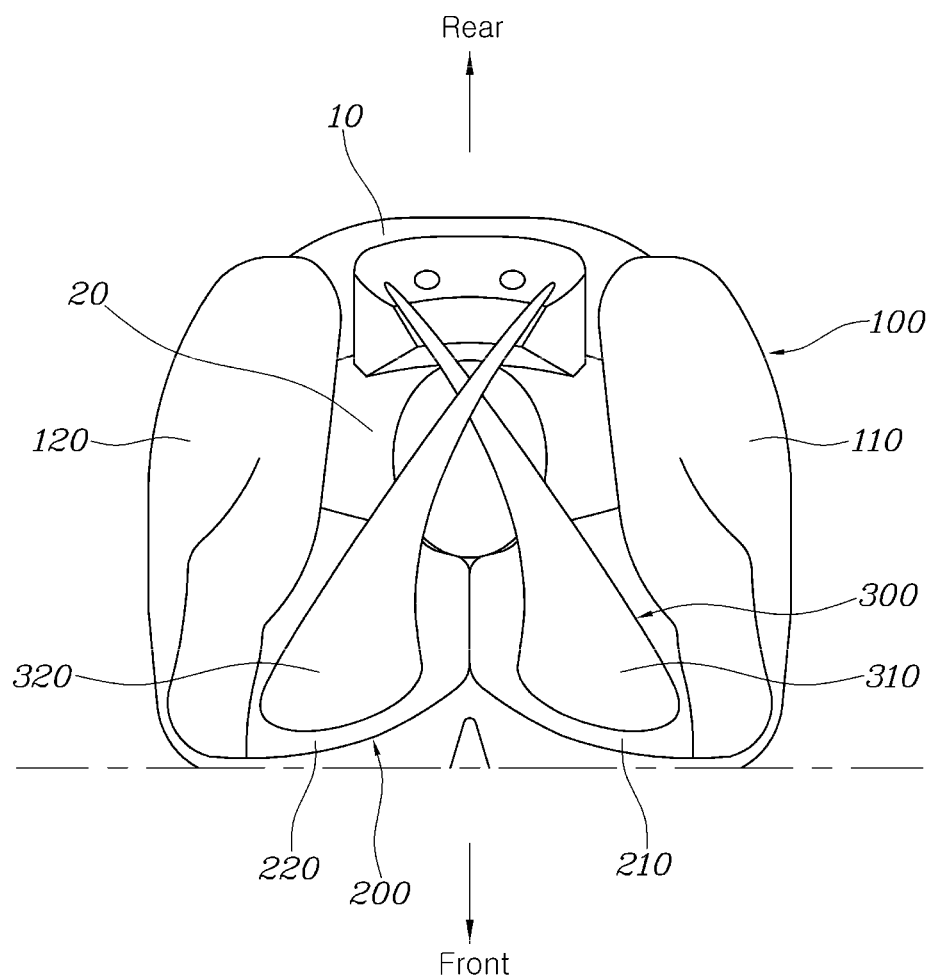
FIGS. 7 and 8 are views for explaining the deployment shapes of a first upper tether and a second upper tether according to the present invention, for each embodiment.
Figure 8:
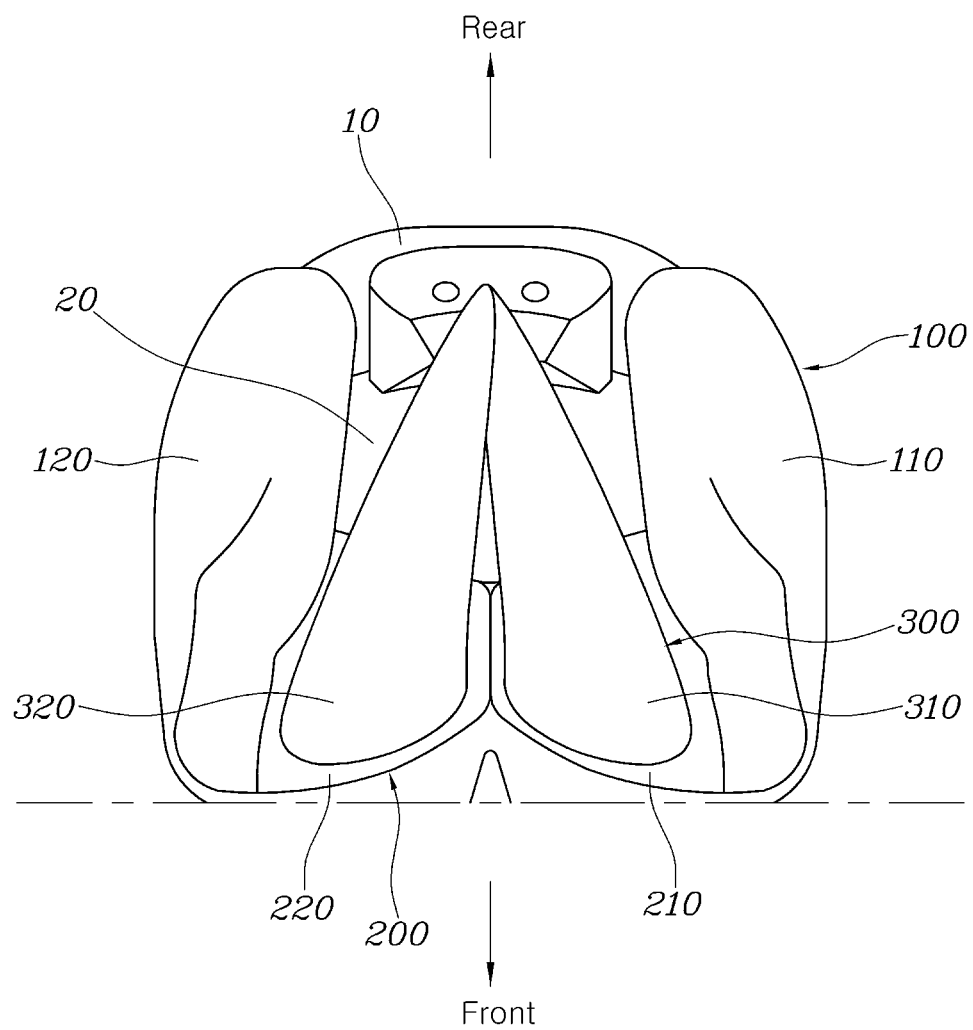

When the first upper tether 310 and the second upper tether 320 are deployed, they can be deployed in a shape of ∥ as shown in FIG. 2 or an X-shape as in FIG. 7 or a V-shape as shown in FIG. 8.

When the first upper tether 310 and the second upper tether 320 are deployed in a V shape, the tension of the first upper tether 310 and the second upper tether 320 is increased compared to when deployed in a ∥ shape, thereby more effective in restraint of passengers. In addition, when the first upper tether 310 and the second upper tether 320 are deployed in an X shape, the tension of the first upper tether 310 and the second upper tether 320 is increased compared to when deployed in a ∥ shape or V shape, so that the passenger can be restrained most effectively.

According to the present invention, the lower tether 400 is formed to have a triangular unfolded shape when deployed. Any one vertex is fixedly coupled to the lower portion of the seatback 10 (a stud that fixes the inflator at the lower portion of the seatback frame or the lower portion of the seatback frame), and one side facing the front is sewn and coupled to the bottom portion of the front cushion 200.

The lower tether 400 is coupled with the bottom portion of the front cushion 200 to prevent the front cushion 200 from being lifted upward when the front cushion 200 is deployed, through which the restraint power of the front cushion 200 can be further strengthened.

The lower tether 400 is formed as a surface than the conventional tether formed in the form of a string, so that the lower tether 400 can exert a stronger restraint force, so that there is advantage of more securely protecting the passenger 20.

In accordance with the present invention, the lower tether 400 is configured to include a first lower tether 410 that is coupled to connect the lower portion of the seatback 10 and the bottom portion of the first front cushion 210, and a second lower tether 420 that is coupled to connect the lower portion of the seatback 10 and the bottom portion of the second front cushion 220.

As described above, the seat airbag for a vehicle according to the embodiment of the present invention is a configuration in which the side cushion 100 is deployed to protrude forward from the seatback 10 to protect the side of the passenger 20, and the front cushion 200 protrudes from the side cushion 100 in front of the passenger 20 to protect the front of the passenger 20. Thus, it can be applied to various autonomous vehicles in which the movement and rotation of the seat and the seating condition of the passenger are various. Particularly, there is an advantage of being able to more effectively protect the passengers 20 of the autonomous vehicle.

In addition, the embodiment according to the present invention is configured with the upper tether 300 and the lower tether 400 that have a predetermined area in order to exert a strong restraint force restraining the deployments of the side cushion 100 and the front cushion 200. Thus, it is possible to effectively restrain the passenger's lateral behavior, forward behavior, and diagonal behavior, thereby further enhancing the passenger's protective effect, and through this, there is the advantage of maximizing the reduction of the passenger's injuries in case of an accident.

In addition, the embodiment according to the present invention is a configuration in which both the side cushion 100 and the front cushion 200 can cover and protect the portion of the shoulder 22 having relatively high rigidity among the body parts of the passenger 20. Thus, there is an advantage that can reduce the injuries to passengers as much as possible.

In addition, the embodiment according to the present invention is a configuration in which the first separator 500 having the first vent hole 510 is installed inside the side cushion 100, the second separator 600 having the second vent hole 610 is installed in the connection portion of the side cushion 100 and the front cushion 200, and the cross-sectional area of the first vent hole 510 is larger than the cross-sectional area of the second vent hole 610. There is an advantage of preventing an airbag deployment failure situation in which the front cushion 200 is first inflated before the side cushion 100 is deployed through tuning of the first vent hole 510 and the second vent hole 610.

The seat airbag for a vehicle according to the present invention is a configuration in which a side cushion is deployed to protrude forward from a seatback to protect the side of a passenger, and a front cushion protrudes from the side cushion in front of the passenger to protect the front of the passenger. Thus, it can be applied to various autonomous vehicles in which the movement and rotation of the seat and the seating condition of the passenger are various. Particularly, there is an advantage of being able to more effectively protect the passengers of the autonomous vehicle.

In addition, the embodiment according to the present invention is configured with an upper tether and a lower tether that have a predetermined area in order to exert a strong restraint force restraining the deployments of the side cushion and the front cushion. Thus, it is possible to effectively restrain the passenger's lateral behavior, forward behavior, and diagonal behavior, thereby further enhancing the passenger's protective effect, and through this, there is the advantage of maximizing the reduction of the passenger's injuries in case of an accident.

In addition, the embodiment according to the present invention is a configuration in which both the side cushion and the front cushion can cover and protect the portion of a shoulder having relatively high rigidity among the body parts of the passenger. Thus, there is an advantage that can reduce the injuries to passengers as much as possible.

In addition, the embodiment according to the present invention is a configuration in which a first separator having a first vent hole is installed inside the side cushion, a second separator having a second vent hole is installed in the connection portion of the side cushion and the front cushion, and the cross-sectional area of the first vent hole is larger than the cross-sectional area of the second vent hole. There is an advantage of preventing an airbag deployment failure situation in which the front cushion is first inflated before the side cushion is deployed through tuning of the first vent hole and the second vent hole.

Although the present invention has been illustrated and described in connection with specific embodiments, it will be obvious to those of skilled in the art that the present invention can be variously improved and changed within the scope of the technical spirit of the present invention provided by the following claims.

What is claimed is:

1. An airbag comprising:
    a side cushion configured to protrude forward from a seatback of a passenger seat and cover a side of a passenger when deployed;
    a front cushion configured to protrude from the side cushion and cover a front of the passenger; and
    an upper tether connected to an upper portion of the seatback, the side cushion and the front cushion, and configured to restrain the deployment of the side cushion and the front cushion,
    wherein the side cushion comprises:
        a first side cushion configured to deploy from a first side of the seatback toward a first space between a vehicle door and the first side of the passenger; and
        a second side cushion configured to deploy from a second side of the seatback toward a second space between a center console and the second side of the passenger, wherein the front cushion comprises:
    a first front cushion configured to extend from the first side cushion when deployed; and
    a second front cushion configured to extend from the second side cushion when deployed, the first and second front cushions being configured to extend laterally toward and contact each other when deployed,
    wherein the upper tether includes:
        a first upper tether configured to connect the upper portion of the seatback, an inner surface of the first side cushion and an upper surface of the first front cushion; and
        a second upper tether configured to connect the upper portion of the seatback, an inner surface of the second side cushion and an upper surface of the second front cushion,
    wherein the first upper tether is configured to increase a first restraining force applied to the first side cushion and the first front cushion as a first connection point between the first upper tether and the upper portion of the seatback moves farther from the first side cushion, and
    wherein the second upper tether is configured to increase a second restraining force applied to the second side cushion and the second front cushion increases as a second connection point between the second upper tether and the upper portion of the seatback move farther from the second side cushion.

2. The airbag of claim 1, wherein the side cushion is configured to cover a side of the passenger's head, shoulder, chest, abdomen and pelvis when deployed.

3. The airbag of claim 1, wherein the front cushion is configured to cover a frontal area of the passenger extending from the passenger's shoulder to abdomen when deployed.

4. The airbag of claim 1, further comprising a first separator dividing an inner space of the side cushion and having a plurality of first vent holes configured to control a flow of an airbag gas.

5. The airbag of claim 4, further comprising:
    a connection passage formed at a front end portion of the side cushion and extending to the front cushion; and
    a second separator positioned at a rear portion of the connection passage and comprising a second vent hole configured to control the flow of the airbag gas supplied to the front cushion.

6. The airbag of claim 5, wherein a cross-sectional area of the first vent hole is larger than that of the second vent hole.

7. The airbag of claim 1, wherein the upper tether is configured to extend over a shoulder of the passenger when deployed while avoiding extending toward a neck of the passenger.

8. The airbag of claim 1, wherein the upper tether has a triangular shape when deployed and unfolded, and is fixedly connected to the upper portion of the seatback.

9. The airbag of claim 1, wherein the first and second upper tethers are configured to deploy in a ‖-shape, an X-shape, or a V-shape.

10. The airbag of claim 1, further comprising a lower tether connecting a lower portion of the seatback and the front cushion and configured to restrain the deployment of the front cushion to prevent the front cushion from being lifted.

11. The airbag of claim 10, wherein the lower tether is configured to have a triangular shape when deployed and unfolded.

12. The airbag of claim 10, wherein the lower tether comprises:
    a first lower tether configured to connect the lower portion of the seatback and a bottom portion of the first front cushion; and
    a second lower tether configured to connect the lower portion of the seatback and a bottom portion of the second front cushion.

* * * * *